United States Patent
Bhattacharyya et al.

(10) Patent No.: US 9,922,136 B2
(45) Date of Patent: Mar. 20, 2018

(54) NON-INTRUSIVE, SEMANTICS-DRIVEN IMPACT ANALYSIS FOR BUSINESS APPLICATIONS

(71) Applicant: International Business Machines Corporation, Armonk, NY (US)

(72) Inventors: Anamitra Bhattacharyya, Chelmsford, MA (US); Krishnamohan Dantam, Chelmsford, MA (US); Sampathkumar Sriramadhesikan, Burlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 14/219,205

(22) Filed: Mar. 19, 2014

(65) Prior Publication Data

US 2015/0269278 A1 Sep. 24, 2015

(51) Int. Cl.
*G06F 17/30* (2006.01)
*G06Q 10/06* (2012.01)

(52) U.S. Cl.
CPC ... *G06F 17/30958* (2013.01); *G06Q 10/0635* (2013.01)

(58) Field of Classification Search
CPC .................. G06F 17/30958; G06Q 10/0635
See application file for complete search history.

(56) References Cited

U.S. PATENT DOCUMENTS

| | | | |
|---|---|---|---|
| 6,983,321 B2 | 1/2006 | Trinon et al. | |
| 7,240,325 B2 | 7/2007 | Keller | |
| 7,505,872 B2 | 3/2009 | Keller et al. | |
| 7,580,913 B2 | 8/2009 | Chandra et al. | |
| 2005/0144527 A1* | 6/2005 | Haas | G06Q 10/00 714/38.1 |
| 2006/0004852 A1* | 1/2006 | Abraham | G06Q 10/10 |
| 2008/0065443 A1* | 3/2008 | Gorur | G06Q 10/103 705/301 |
| 2009/0138294 A1* | 5/2009 | Kumaran | G06Q 10/10 705/7.27 |
| 2010/0153153 A1* | 6/2010 | Balko | G06F 8/71 707/695 |
| 2013/0041924 A1 | 2/2013 | Vernier | |
| 2014/0019597 A1* | 1/2014 | Nath | H04L 41/0843 709/220 |

\* cited by examiner

*Primary Examiner* — Grace Park
(74) *Attorney, Agent, or Firm* — Cuenot, Forsythe & Kim, LLC (57) ABSTRACT

Impact analysis for business applications can include receiving an event for a business application system, wherein the event specifies a change to an artifact of the business application system, and determining a node of a directed graph to which the event applies as a source node. The directed graph represents the business application system. The directed graph is formed by a plurality of nodes joined by links, wherein each node represents an artifact of the business application system and each link specifies semantic data indicating a dependency between the nodes joined by the link. Impact analysis further includes determining, using a processor, artifact assessment data for a first node connected to the source node through a first link, wherein the artifact assessment data includes a type of an effect of the event upon the first node and a context for the effect.

13 Claims, 4 Drawing Sheets

|  | Deployment Context | Runtime Context | Customization Context |
|---|---|---|---|
| Broken Artifacts | 9 | 1 | 5 |
| Artifact(s) Requires Regression Testing | 8 | 4 | 15 |
| Artifact(s) Needs Re-Configuration | 10 | 3 | 17 |

NON-INTRUSIVE, SEMANTICS-DRIVEN IMPACT ANALYSIS FOR BUSINESS APPLICATIONS

BACKGROUND

A variety of packaged business applications are available from different manufacturers. In many cases, two or more of such applications are installed within a computing environment to operate cooperatively as a system or as part of a larger system. The purchasing organization typically changes the packaged business applications to achieve interoperability with other applications and/or systems and to better suit the needs of the organization. Unfortunately, measuring the impact of changes to a system including one or more packaged business applications is difficult. Such is the case as most packaged business applications operate as black boxes allowing users and administrators to view inputs and outputs, while obscuring or hiding internal operations.

Accordingly, when introducing a change to a system, it is difficult for end users and administrators alike to determine whether the change will have an adverse effect upon application availability, system functionality, and/or system performance. In many cases, adverse effects such as an application being rendered unavailable, broken functionality, reduced system responsiveness, and/or the like are only discovered well after the change has been introduced into the system. Correspondingly, it is also difficult to determine whether a change to a system will have a positive effect and/or potentially lead to further unrealized benefits.

SUMMARY

A system includes a processor programmed to initiate executable operations. The executable operations include receiving an event for a business application system, wherein the event specifies a change to an artifact of the business application system, and determining a node of a directed graph to which the event applies as a source node. The directed graph represents the business application system. The directed graph is formed by a plurality of nodes joined by links, wherein each node represents an artifact of the business application system and each link specifies semantic data indicating a dependency between the nodes joined by the link. For example, each link may specify semantic data indicating the nature of dependency between the nodes joined by the link. The executable operations also include determining artifact assessment data for a first node connected to the source node through a first link, wherein the artifact assessment data includes a type of an effect of the event upon the first node and a context for the effect.

A computer program includes a computer readable storage medium having program code stored thereon. The program code is executable by a processor to perform a method. The method includes receiving, using the processor, an event for a business application system, wherein the event specifies a change to an artifact of the business application system, and determining, using the processor, a node of a directed graph to which the event applies as a source node. The directed graph represents the business application system. The directed graph is formed by a plurality of nodes joined by links, wherein each node represents an artifact of the business application system and each link specifies semantic data indicating a dependency between the nodes joined by the link. The method further includes determining, using the processor, artifact assessment data for a first node connected to the source node through a first link, wherein the artifact assessment data includes a type of an effect of the event upon the first node and a context for the effect.

BRIEF DESCRIPTION OF THE SEVERAL VIEWS OF THE DRAWINGS

FIGS. 5-1 through 5-3, taken collectively, illustrate an exemplary directed graph in various forms.

DETAILED DESCRIPTION

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to impact analysis for business application systems, and, more particularly, to conducting impact analysis using non-intrusive techniques. In accordance with the inventive arrangements disclosed herein, metadata for one or more metadata driven applications is analyzed. From the metadata, a system of linked data such as a directed graph may be generated. The linked data may be used to determine the impact of an event, e.g., a change to the metadata, of a business application system.

The linked data, which may be specified as a directed graph, represents the business application system and describes the behavior of the system. The directed graph describes the various artifacts forming the system and the interactions and/or dependencies among the artifacts. In cases where the business application system includes more than one business application, the linked data may specify interactions between the different business applications. For example, a directed graph is formed of a plurality of nodes. The nodes are joined, or connected, by links. Each node represents an artifact of the business application system. Each link is associated with semantic data specifying any dependencies that may exist between the nodes joined by the link.

The impact, or effect, of an event upon the business application system may be determined through analysis of the directed graph. The effect of the event may be measured, or determined, in a non-intrusive manner. In one aspect, the effect of the event may be measured without first having to apply the change to a live business application system. Alternatively, a change specified by an event may be introduced to the business application system and also evaluated using the linked data to measure the effect of the event upon the system. The effect of the event may be measured in one or more different dimensions, thereby providing users and/or administrators further insight as to how to mitigate any impact the event may have or to improve implementation of a change to the business application system as specified by an event.

Figure 1:
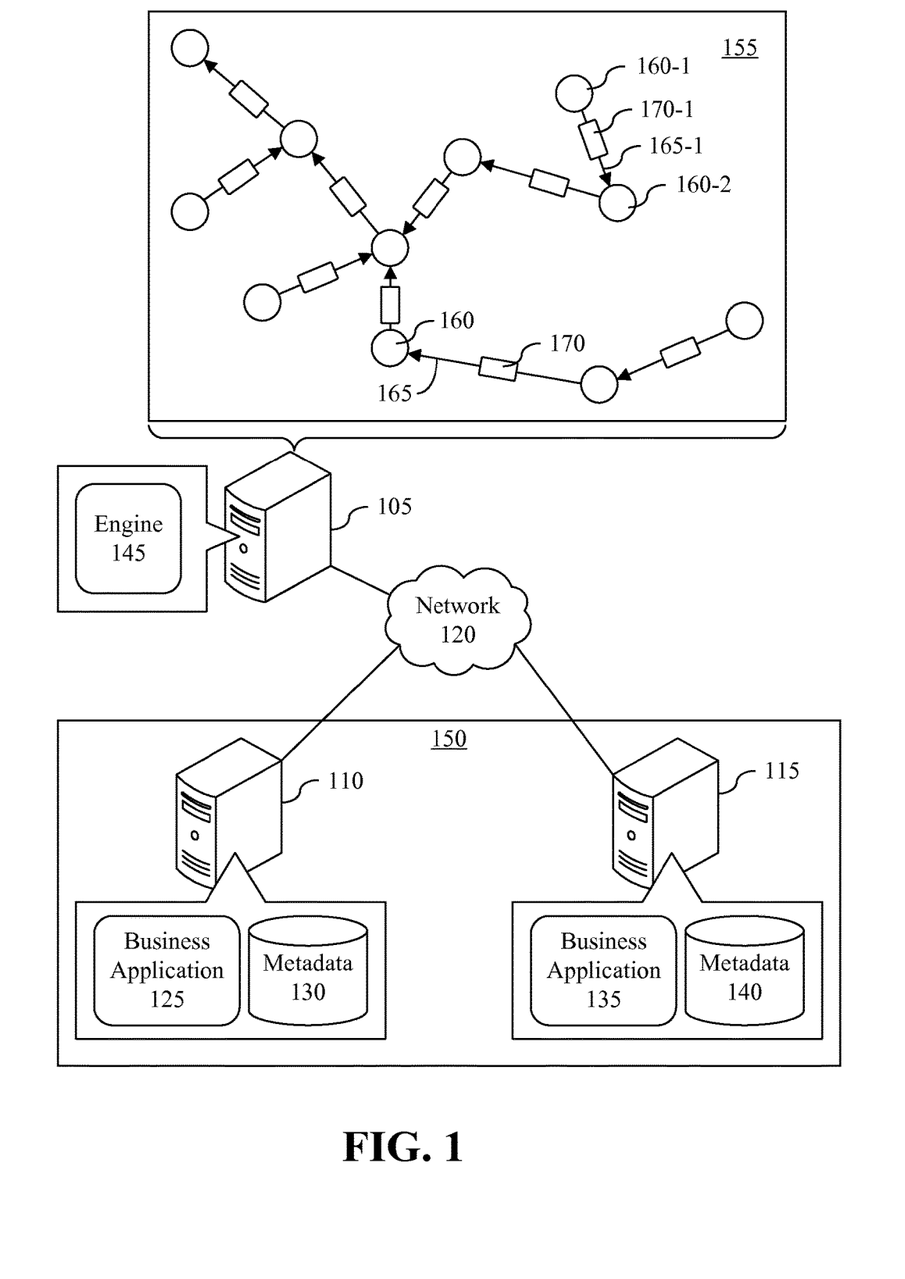
FIG. 1 is a block diagram illustrating an exemplary communication system.

FIG. 1 is a block diagram illustrating an exemplary communication system 100. Communication system 100 includes a plurality of data processing systems 105, 110, and 115, communicatively linked by a network 120.

Network 120 is the medium used to provide communication links between various devices and data processing systems, e.g., data processing systems 105, 110, and 115, connected together within communication system 100. Network 120 may include connections, such as wire, wireless communication links, or fiber optic cables. Network 120 may be implemented as, or include, any of a variety of different communication technologies such as a Wide Area Network (WAN), a Local Area Network (LAN), a wireless network, a mobile network, a Virtual Private Network (VPN), the Internet, the Public Switched Telephone Network (PSTN), or the like.

Data processing system 110 executes a business application 125. Business application 125 is metadata driven and includes a data storage device storing metadata 130. Data processing system 115 executes a business application 135. Business application 135 is metadata driven and includes a data storage device storing metadata 140. Taken collectively, data processing systems 110 and 115 form a business application system 150.

As used within this disclosure, a "metadata driven application" means an application program, or a plurality of interoperable application programs, whose behavior and functionality when executed by a data processing system are determined by metadata. Metadata for a metadata driven application, in general, models the functionality and dictates the behavior of the application. For example, the metadata of a metadata driven application specifies the artifacts, e.g., components, that form the application. The metadata further specifies the particular data items that are consumed and/or produced by the artifacts, the artifact from which data items are received, and/or the artifacts to which data items are sent. As used within this disclosure, an "artifact" means a digital component of a business application that is metadata driven. Examples of artifacts include, but are not limited to, objects, methods, schemas, services, mobile applications, desktop applications, and/or the like.

Data processing system 105 executes an engine 145. In executing engine 145, data processing system 105 is able to read and analyze metadata 130 and metadata 140. In one aspect, data processing system 105 reads metadata 130 and metadata 140, analyzes metadata 130 and metadata 140, and generates linked data as a directed graph 155.

Directed graph 155 is a representation of the operation of business application system 150. Directed graph 155 includes a plurality of nodes 160, illustrated in FIG. 1 as circles. Each node represents an artifact of business application system 150. Nodes 160 are joined, or connected, by links 165. Responsive to analysis by data processing system 105 executing engine 145, each of links 165 is associated with semantic data 170. Semantic data 170 specifies any dependencies that exist between nodes 160.

In the example of FIG. 1, nodes 160-1 and 160-2 are joined by link 165-1. The links shown are directed in that each link has an arrow indicating direction between nodes. Direction of the link indicates dependency. In the example of FIG. 1, the direction of link 165-1 is from node 160-1 to node 160-2. The direction of link 165-1 indicates that node 160-1 depends upon node 160-2. More particularly, node 160-1 depends upon data items specified by semantic data 170-1 also referred to as herein as "dependencies." As an example, in order to deliver application data into a mobile device, the content/format of that application data is determined by an object structure. The application for the mobile device, e.g., as represented by node 160-1, depends upon the object structure which may be provided by node 160-2 and specified in semantic data 170-1 of link 165-1.

In one aspect, engine 145 includes a crawler. While the generation of directed graph 155 has been noted and may be performed by data processing system 105, in another aspect, engine 145 may be provided with an initial version of directed graph 155. In that case, the initial version of directed graph 155 may be a template describing the standard, or "out of the box" and un-customized, artifacts and artifact relationships of business application system 150. Though not visually differentiated, nodes representing artifacts of both business application 125 and business application 135 are pictured in directed graph 155.

In any case, business application 125 may be built upon metadata 130, which specifies artifacts including, but not limited to, workflows, domain specific (e.g., business) objects such as Work Orders, Purchase Orders, Change Requests, etc., cron jobs, Web services, escalations, notifications, applications whether mobile or desktop, security settings, reports, and integration details with other business applications such as business application 135, which has its own metadata 140. As each of business applications 125 and 135 evolves at a user site, engine 145 is able to detect actual instances of integrations, escalations, applications, etc., that may be added to the metadata and, as such, are added to directed graph 155 by data processing system 105.

For example, if a new Web service is deployed against a Work Order business object in business application 125, as specified by metadata 130, data processing system 105 detects such an event and, in response, creates a series of new nodes and links in directed graph 155. Continuing with the example, data processing system 105 may create a node representing a Primary Work Order business object in directed graph 155. Data processing system 105 then may form a link from the newly created node representing the Primary Work Order business object to another newly created node representing a Work Order resource such as an XML schema. Data processing system 105 further may form a link from the node representing the XML schema to another newly created node representing a Web service. Data processing system 105 may continue to generate links based on actual deployments in a continuous manner as business application system 150 evolves through monitoring of metadata 130 and metadata 140.

Communication system 100 is provided for purposes of illustration only. A communication system may include additional data processing systems or fewer. For example, business application system 150 may include one or more additional data processing systems each executing a business application and including metadata. In another example, business application system 150 may include only one data processing system executing a single business application having metadata. In yet another example, a single data processing system may execute two or more business applications each having its own metadata. Further, metadata for a business application may be stored in any of a variety of different data structures and will depend upon the particular business application to which the metadata belongs. For example, metadata may be stored as one or files, e.g., markup language files, organized in a hierarchical directory, within a database, or the like.

Figure 2:
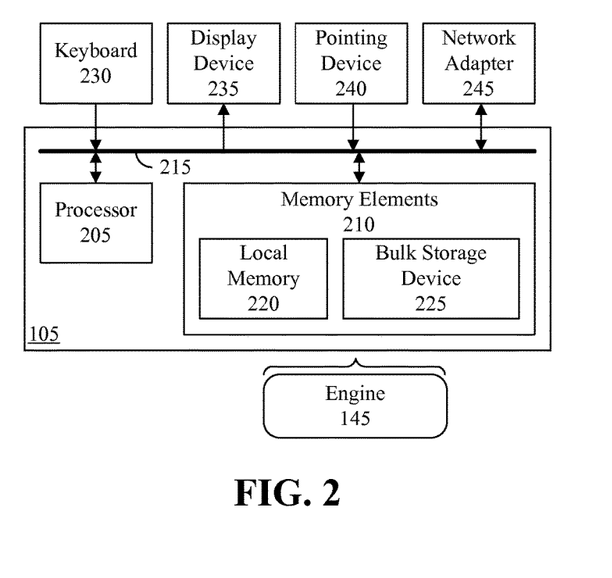
FIG. 2 is a block diagram illustrating an exemplary data processing system.

FIG. 2 is a block diagram illustrating an exemplary data processing system. More particularly, FIG. 2 illustrates an exemplary implementation of data processing system (system) 105 of FIG. 1. It should be appreciated that data processing system 110 and/or data processing system 115 also may be implemented using an architecture and/or implementation as pictured in FIG. 2. The program code stored and/or executed, however, will vary in accordance with the particular data processing system that is implemented and the function of the data processing system.

System 105 can include at least one processor 205 coupled to memory elements 210 through a system bus 215 or other suitable circuitry. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), an application specific integrated circuit (ASIC), and a controller. As such, system 105 can store program code within memory elements 210. Processor 205 executes the program code accessed from memory elements 210 via system bus 215 or the other suitable circuitry.

In one aspect, system 105 is a computer or other programmable data processing apparatus that is suitable for storing and/or executing program code. It should be appreciated, however, that system 105 may be implemented in the form of any system including a processor and memory that is capable of performing and/or initiating the functions and/or operations described within this disclosure. Further, system 105 may be implemented in any of a variety of different form factors.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 may be implemented as a hard disk drive (HDD), solid state drive (SSD), or other persistent data storage device. System 105 may include one or more cache memories (not shown) that provide temporary storage of at least some program code in order to reduce the number of times program code must be retrieved from bulk storage device 225 during execution. In general, memory elements 210, local memory 220, and/or bulk storage device 225 are examples of computer readable storage media or computer readable storage mediums.

Input/output (I/O) devices such as a keyboard 230, a display device 235, and a pointing device 240 optionally can be coupled to system 105. The I/O devices may be coupled to system 105 either directly or through intervening I/O controllers. One or more network adapters 245 also may be coupled to system 105 to enable a system 105 to become coupled to other systems, computer systems, remote printers, and/or remote storage devices through intervening private or public networks. Modems, cable modems, wireless transceivers, and Ethernet cards are examples of different types of network adapters 245 that can be used with system 105.

As pictured, memory elements 210 store engine 145. Engine 145 is implemented as executable program code that is executed by processor 205. As such, engine 145 is considered an integrated part of system 105. System 105, in executing engine 145, performs and/or initiates the various functions and/or operations described within this disclosure. Further, engine 145, including any parameters and/or attributes utilized by engine 145, including any metadata repositories and/or data items obtained therefrom, are functional data structures that impart functionality when employed as part of system 105.

Figure 3:
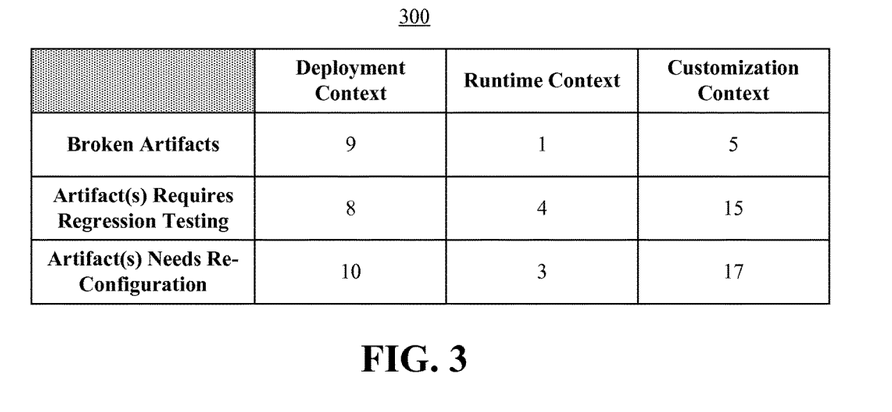
FIG. 3 is a table illustrating exemplary artifact assessment data.

FIG. 3 is a table 300 illustrating exemplary artifact assessment data. The artifact assessment data, as presented in table 300, is a three dimensional (3D) matrix that may be generated by system 105, also referred to herein as the "impact analysis system" or "IA system." The artifact assessment data pictured in table 300, or a portion of the artifact assessment data pictured in table 300, may be generated on a per-node basis for a directed graph. Further, the artifact assessment data, or portion thereof, may be generated for each node on a per-event, or change, basis. In one aspect, however, the artifact assessment data for a selected event may be summed for multiple nodes or for all nodes of a directed graph as pictured in FIG. 3.

In general, table 300 lists three different contexts in which artifacts of a business application system may be impacted as determined by the IA system. Within each context, the IA system determines how the artifact is affected by determining a type of effect expected upon the artifact. The different contexts that may be determined by the IA system and included in table 300 include deployment, runtime, and customization.

As used within this disclosure, the term "deployment" or the phrase "deployment context" means that the IA system has determined that artifact(s) listed in the deployment context column are, or will be, affected by a patch or an upgrade. A "patch" or an "upgrade" means a change to an artifact of the business application system where the source, or origin, of the change is the provider, developer, or manufacturer of the business application system including the node to which the change is to be applied. In one aspect, a "change" for a patch and/or an upgrade means the inclusion, e.g., injection, of program code into an artifact. For example, a patch may include injection and/or inclusion of binary code such as Java classes. In another aspect, however, a "change" for a patch and/or an upgrade means a change, whether inclusion of additional, or deletion of existing, metadata. A change to metadata may include changes to one or more markup language, e.g., XML, files and/or database representations. Further, it should be appreciated that application of a single patch and/or upgrade may result in the application and/or inclusion of a plurality of changes, e.g., tens, hundreds, etc., whether one or more code injections, one or more metadata changes, or a combination of both types of changes.

As used within this disclosure, the term "runtime context" means that the IA system has determined that the artifact(s) listed in the runtime context column are, or will be, affected during normal runtime operation of the business application system. As an example, consider the case where a new service is created within the business application system. Workflow processors executing in the business application system trigger electronic mail notifications to a purchasing node, budgeting agents, team leads, or the like. If the electronic mail notification is inadvertently turned off, the business application system may generate an error during runtime since the workflow is broken or the service is inactive.

As used within this disclosure, the term "customization context" means that the IA system has determined that the artifact(s) listed in the customization context column are, or will be, affected as a result of a customization to the business application system. A customization means that program code, e.g., custom program code as opposed to a patch or an upgrade, is, or will be, injected into an artifact of the business application system. A customization is source code that does not originate from the provider, developer, or manufacturer of the business application including the artifact to which the custom program code is included.

In a customization context, for example, the IA system may be consulted. The IA system introspects the artifact that is injected with custom program code. The IA system determines any effect(s) of the injected program code upon the artifact, as represented by a node, and/or artifacts represented by other nodes joined to the injected node by links through evaluation of the directed graph. For any of a variety of different nodes, the IA system may indicate that one or more actions should be taken or considered. In illustration, the IA system may indicate that the program code injection warrants further testing, further custom code, and/or further configuration and/or re-configuration as the case may be.

In another example, the customization is the addition of a new attribute to an artifact, e.g., a new attribute to a business object such as a Work Order business object. Consider the case where the directed graph includes a node representing a Work Order artifact, linked to a node representing a Work Order resource, which is further linked to a node representing a mobile application. In this example, the resource document specifies the Work Order artifact, dependencies of the Work Order artifact upon one or more other related business object artifacts such as "Asset," and any other properties relevant to the Work Order artifact from the point of view of being used in the mobile application. In that case, the IA system may indicate to an administrator that were the resource document to be regenerated for the Work Order resource, the new attribute, i.e., the new text field, may be included in the mobile application thereby allowing end users to utilize the added functionality and improving user experience with the business application system.

As noted, within each context, the particular effect upon artifacts may be specified. For example, within each context, an artifact can be determined to be "broken," "requires regression testing," or "needs re-configuration." An artifact that is broken is an artifact, or node, that will not function as designed or configured because of a change in a prior node in the directed graph that adversely affects the instant, or broken, node. An artifact that requires regression testing is an artifact, or a node, that will require regression testing in order to determine whether the artifact will function as designed or configured when the change is applied to the business application system. As an example, in the event custom program code is added to an artifact, the custom program code may not be available for evaluation or difficult to evaluate. In that case, other artifacts depending upon the artifact to which the custom program code is added may be determined to require regression testing to determine the full effect of the added program code. An artifact that needs configuration is an artifact or a node in the directed graph that is determined to provide an added benefit if re-configured in response to a change in a prior node in the graph. An example of a node requiring reconfiguring is one that would provide added functionality if reconfigured, e.g., reconfiguring a node to include an attribute added to a prior node, as previously described.

Referring to table 300, the numbers provided may be references, or indicators, of the particular nodes that are affected. Each node of the directed graph, for example, may be assigned a unique identifier. Thus, in response to a given event, e.g., a change to a business application system, the IA system has determined that node 9 of the directed graph is broken within the deployment context. Node 8, within the deployment context, requires regression testing. Node 10 within the deployment context needs re-configuration. In response to the same event, the IA system has determined that, within the runtime context, node 1 is broken; node 4 requires regression testing; and, node 3 needs re-configuration. In response to the same event, the IA system has determined that, within the customization context, node 5 is broken; node 15 requires regression testing; and, node 17 needs re-configuration.

FIG. 3 is provided for purposes of illustration only. It should be appreciated that more than one node may be determined to be broken, require regression testing, or need re-configuration in one or more or all contexts or that no nodes may be so classified in one or more or all contexts responsive to any given change. Nodes that are not broken, do not require regression testing, and that do not need re-configuration are said to be "unaffected" by the event.

Figure 4:
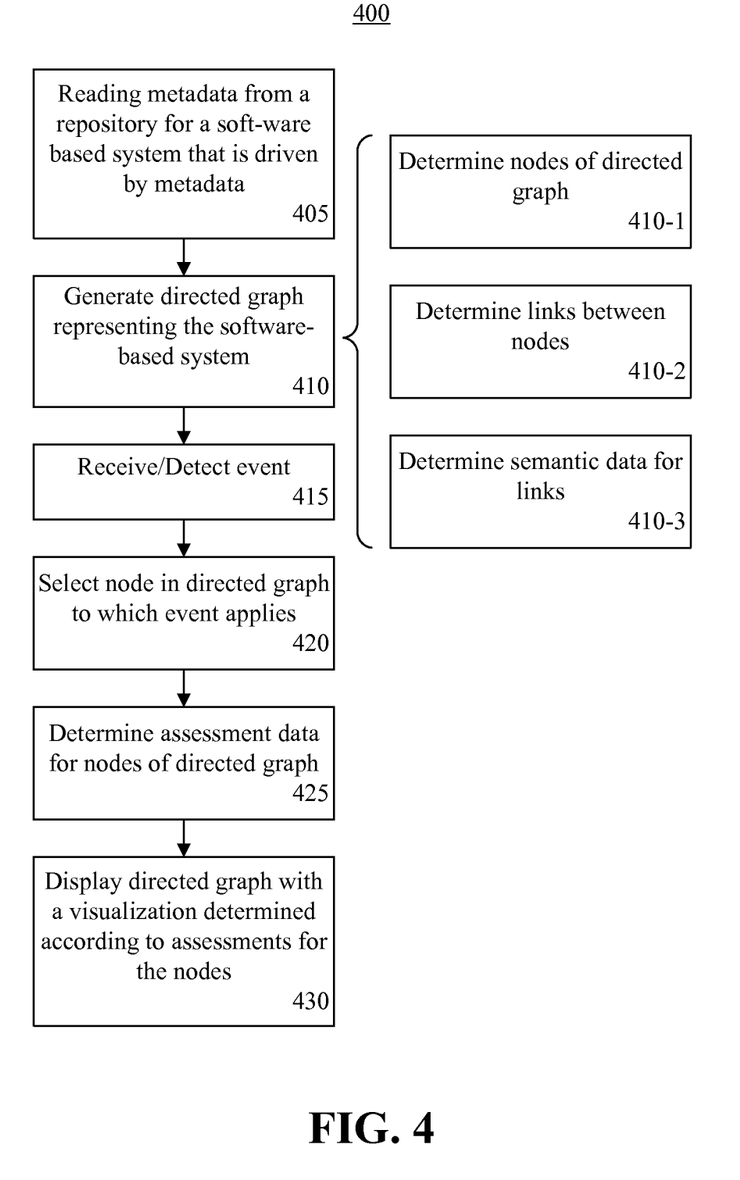
FIG. 4 is a flow chart illustrating an exemplary method of performing impact analysis for a business application system.

FIG. 4 is a flow chart illustrating an exemplary method 400 of performing impact analysis for a business application system. Method 400 may be performed by a data processing system such as system 105 of FIGS. 1 and 2, referred to herein as the "IA system." Method 400 may begin in a state where the IA system has been configured with information allowing the IA system to access one or more or each metadata repository of a business application executing in a data processing system as part of a business application system. It should be appreciated that as each different business application may utilize a different data structure and/or syntax for storing and/or specifying metadata, the IA system is configured to read and/or understand any such data structures and/or syntaxes that may be used for metadata that the IA system is intended to read and/or analyze.

Accordingly, in block 405, the IA system reads metadata from one or more metadata repositories. Each metadata repository is for a business application that is metadata driven, executing within a data processing system, and part of a business application system. In block 410, the IA system generates a directed graph representing the business application system. For example in performing block 410, the IA system can determine nodes of the directed graph in block 410-1. As described, each node represents an artifact of the business application system. In block 410-2, the IA system determines links between the nodes. In block 410-3, the IA system determines semantic data for the links.

While method 400 includes blocks for generating the directed graph, in another aspect, a directed graph that has been generated is provided to the IA system. In either case, the IA system can update the directed graph over time as any events, e.g., changes to the metadata of one or more of the business applications of the business application system, occur.

In block 415, the IA system detects an event within the business application system or receives an event. In one aspect, the event is a change that is made to the business application system. For example, the change is a change to metadata of one or more of the business applications of the business application system. In another aspect, the IA system is provided with the change. For example, rather than applying the change to the business application system, the change, e.g., changed metadata, is provided to the IA system for analysis.

In block 420, the IA system selects the node in the directed graph to which the event applies, which is referred to as the "source node." The IA system determines the particular artifact to which the change to the business application system is to be applied. The node representing the determined artifact is then selected. In block 425, the IA system determines artifact assessment data for nodes in the directed graph. The IA system traverses the directed graph by following links from the source node.

For example, the IA system identifies which elements of the source node have changed in consequence of the event. The IA system visits a first node that is connected to the source node by a link. The IA system determines the particular data items upon which the first node depends that are obtained from the source node from the semantic data associated with the traversed link. The IA system then compares the data items relied upon by the first node with those that have change in the source node.

The IA system, in comparing the semantic data of the traversed link with the changed elements of the source node, determines whether the first node is affected, if at all. If the first node is unaffected, the IA system continues with evaluating another node of the directed graph. If the first node is affected, the IA system determines the context in which the first node is affected. As discussed, the IA system selects a context as one of a plurality of predetermined contexts which are "deployment," "runtime," and "customization." Further, the IA system determines the type of effect that is determined for the first node, e.g., whether the first node is broken, requires regression testing in order to determine whether the first node is actually affected by the change, or needs re-configuration. The IA system continues evaluating nodes of the directed graph as described in order to generate and/or determine the artifact assessment data. Artifact assessment data determined for the each node of the directed graph is stored in association with the node, whether separate from the directed graph or as part of the directed graph.

In block 430, the IA system displays the directed graph using a visualization technique that depends upon the artifact assessment data. For example, the various nodes of the directed graph may be generated or drawn upon a display screen with visual indicators indicating a context for a node and/or the type of effect that is determined for the node. Further, those nodes determined to be unaffected by the change may be so indicated. Displaying a visualization of the directed graph is one example of how the artifact assessment data may be provided to a user. In another example, artifact assessment data may be presented in tabular form as illustrated in FIG. 3. In still another example, the artifact assessment data may be stored in a database, within a markup language file, a text file, or the like.

Figure 51:
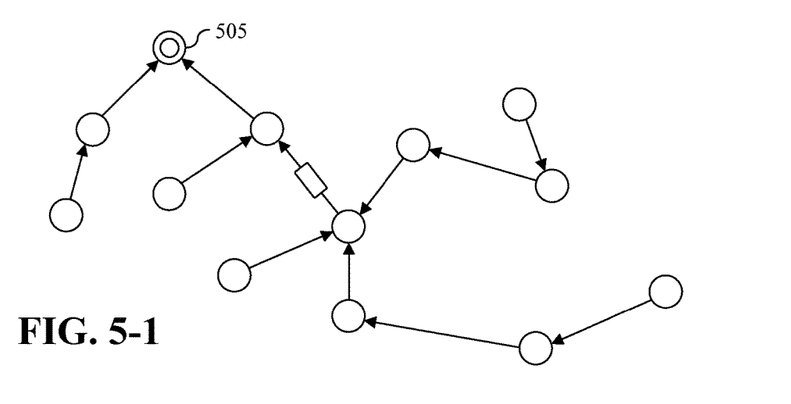
Figure 52:
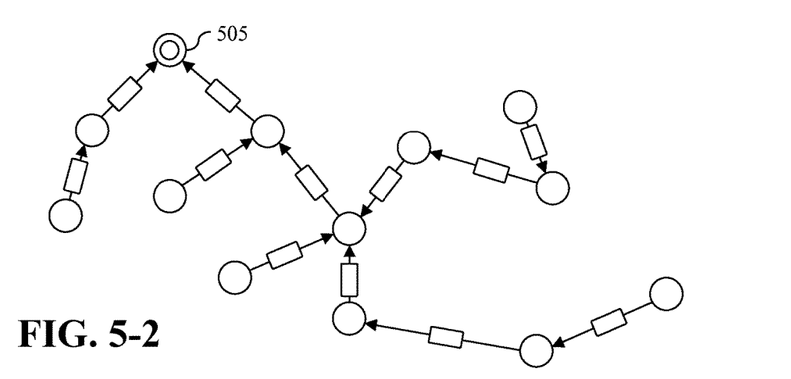
Figure 53:
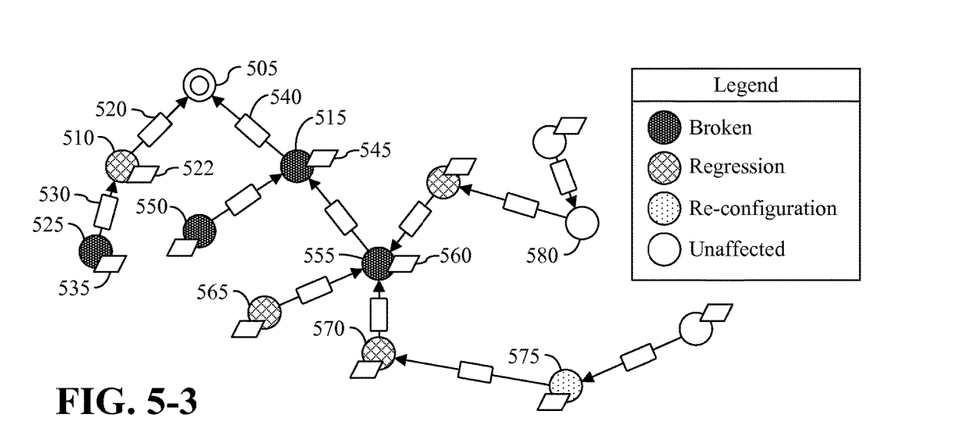

FIGS. 5-1 through 5-3, taken collectively, illustrate an exemplary directed graph in various forms. FIG. 5-1 illustrates an exemplary directed graph where artifacts are represented by nodes and dependencies between artifacts are represented by links connecting the nodes. The directed graph illustrated in FIG. 5 may include nodes from two or more different business applications that are integrated and part of a same business application system. Node 505 represents the source node, which is the node to which an event is to be applied. As discussed, the event may specify a change to the metadata for the business application to which node 505 belongs and, more particularly, to the artifact represented by node 505.

FIG. 5-2 illustrates the directed graph of FIG. 5-1 with the addition of semantic data. Semantic data is represented as the rectangular shapes superimposed over each of the links connecting nodes. Semantic data indicates the particular data items that sent from a node, received by a node, etc. In this regard, semantic data indicates dependencies between nodes.

FIG. 5-3 illustrates the directed graph of FIG. 5-2 with the addition of artifact assessment data for the various nodes shown. Further, a visualization technique has been applied in FIG. 5-3 which illustrates the type of effect that is determined for the various nodes of the directed graph in consequence of application of the event to node 505.

In illustration, consider a case in which an event is detected for the business application system represented by the directed graph of FIG. 5-3. Using metadata associated with the event, the IA system determines that the event specifies a change to node 505, i.e., the source node. For example, the event may be the imposition of a restricted form of access upon the business application system such as a lock down or imposition of an administrative mode upon the business application system or one or more parts of the system. The IA system determines the effect of the event upon other nodes of the directed graph that are linked to node 505 based upon the determined impact, or effect(s), of the event upon node 505.

In further illustration, consider the case in which node 510 and node 515 are directly impacted by the event to node 505. Continuing with the prior example, the event applied to node 505 may specify the implementation of a lock down or an administrative mode within the business application system. The IA system traverses from node 505 to node 510 and, in doing so, reads semantic data 520. Semantic data 520 specifies that "no events are issued when Purchase Order is updated." Based upon the effect of the event upon source node 505 and semantic data 520, the IA system determines that the event does cause an effect upon node 510. Further, the IA system determines that the effect upon node 510 has a runtime context. Within the runtime context, the IA system determines that the type of the effect is regression testing meaning that regression testing is required to determine the full extent of the effect(s) of the event upon node 510. The context of runtime and the type of effect as regression is annotated or written to artifact assessment data 522. Further, in terms of presenting artifact assessment data to the user, node 510 has been visually adjusted with cross-hatching to indicate the status of node 510 as requiring regression testing.

As the IA system traverses down from node 510 to node 525, the IA system evaluates semantic data 530. The IA system performs the same analysis upon node 525 by determining whether the event applied to source node 505 has any effect upon node 525 and, if so, the context and type of the effect. Because node 525 is connected to node 510 by a link, node 525 inherits the context of node 510. Thus, the context of node 525 also is runtime. While the context of the effect, if any, is inherited from node 510, the effect upon node 525 may be completely different than the effect observed for node 510. For example, the type of effect determined for node 525 may be unaffected, broken, regression, or re-configuration regardless of the type of effect determined for node 510. In this example, the IA system determines that node 525 has a type of effect of broken, which is visually indicated by the darker shading applied to node 525. The IA system writes the runtime context and the broken type to artifact assessment data 535, which is associated with node 535.

Continuing with the example, the IA system traverses from node 505 to node 515 and, in doing so, reads semantic data 540. Semantic data 540 specifies that "no tags are refreshed for mobile applications running from the same business application." Based upon the effect of the event upon node 505 and semantic data 540, the IA system determines that there is an effect upon node 515. Further, the IA system determines that the effect upon node 515 has a deployment context as semantic data 540 relates to the deployment of mobile applications. Within the deployment context, the IA system determines that the type of effect is broken as indicated by the dark shading applied to node 515. The context of deployment and the type of broken is annotated or written to artifact assessment data 545.

As discussed, nodes linked beneath node 545 inherit the same context as node 545. Thus, other nodes such as nodes 550 and 555, for example, also have a deployment context. Still, the particular type of effect upon each node is independent. For example, artifact assessment data 560 for node 555 may be entirely different from artifact assessment data 545 for node 515. Artifact assessment data 560 may state "Purchase Order XML cannot be delivered to different_application end point". For purposes of illustration, "different_application" refers to an artifact of a different business application than the artifact represented by node 555. In the example of FIG. 5-3, the IA system has determined that nodes 550 and 555 have a type of broken. Nodes 565 and 570, for example, have a context of deployment and a type of regression. Node 575 has a context of deployment and a type of re-configuration. Still, node 580 has a context of deployment, but is unaffected. In the case where a node is unaffected in terms of type, the context of the linked node need not be inherited or specified in the artifact assessment data of an unaffected node.

As previously discussed, artifact assessment data may be presented as pictured in FIG. 5-3. It should be appreciated that any of a variety of different visualization techniques such as coloring, shading, underlining of text or application of other text features, labels, etc., may be used to visually indicate the context for a node and/or the type of effect for a node. Further, artifact assessment data may be presented in tabular form as illustrated in FIG. 3.

The inventive arrangements described within this disclosure provide non-intrusive techniques for impact analysis of an event, e.g., a change, upon a business application system. By analyzing metadata from one or more metadata driven applications that operate cooperatively to form a business application system, linked data indicating dependencies may be developed and analyzed to determine the effect of a change introduced and/or applied to an artifact of the business application system. Users and administrators are provided with the impact analysis in the form of artifact assessment data in any of a variety of different formats, thereby providing such individuals with insight as to how the business application system will react and/or behave responsive to application and/or introduction of the change.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
receiving an event for a business application system, wherein the event specifies a patch, upgrade or change to metadata of an artifact of the business application system;
determining a node of a directed graph to which the event applies as a source node;
wherein the directed graph represents the business application system, the directed graph is formed by a plurality of nodes joined by links, each node represents an artifact of the business application system, and each link specifies semantic data indicating a dependency between the nodes joined by the link;
traversing the directed graph by following a first link from the source node to a first node connected to the source node through the first link and, from the semantic data specified by the first link, identifying at least one data item obtained by the first node from the source node;
identifying the artifact represented by the source node that has changed in consequence of the event; and determining artifact assessment data for the first node connected to the source node through the first link, determining the artifact assessment data comprising determining whether the at least one data item obtained by the first node from the source node is affected by a change to the first artifact resulting from the event, wherein the artifact assessment data indicates a type of an effect of the event upon the first node and indicates a context for the effect.

2. The system of claim 1, wherein the processor is further programmed to initiate executable operations comprising:
first generating the directed graph.

3. The system of claim 1, wherein the processor is further programmed to initiate executable operations comprising:
selecting a second node connected to the first node through a second link; and
assigning the context of the first node to the second node through inheritance.

4. The system of claim 1, wherein determining artifact assessment data for the first node comprises:
selecting the context from a plurality of predetermined contexts comprising deployment, runtime, and customization.

5. The system of claim 1, wherein the event further specifies a change to metadata of a business application that is metadata driven and part of the business application system.

6. The system of claim 1, wherein determining the artifact assessment data for the first node is performed prior to the patch, upgrade or change being applied to the metadata of the artifact.

7. The system of claim 1, wherein the type of effect of the event upon the first node indicated by the artifact assessment data is a respective artifact represented by the first node is broken or requires regression testing as an effect of the event upon the respective artifact represented by the first node.

8. A computer program product comprising a computer readable storage medium having program code stored thereon, the program code executable by a processor to perform a method comprising:
receiving, using the processor, an event for a business application system, wherein the event specifies a patch, upgrade or change to metadata of an artifact of the business application system;
determining, using the processor, a node of a directed graph to which the event applies as a source node;
wherein the directed graph represents the business application system, the directed graph is formed by a plurality of nodes joined by links, each node represents an artifact of the business application system, and each link specifies semantic data indicating a dependency between the nodes joined by the link;
traversing, using the processor, the directed graph by following a first link from the source node to a first node connected to the source node through the first link and, from the semantic data specified by the first link, identifying at least one data item obtained by the first node from the source node;
identifying, using the processor, the artifact represented by the source node that has changed in consequence of the event; and
determining, using the processor, artifact assessment data for the first node connected to the source node through the first link, determining the artifact assessment data comprising determining whether the at least one data item obtained by the first node from the source node is affected by a change to the first artifact resulting from the event, wherein the artifact assessment data indicates a type of an effect of the event upon the first node and indicates a context for the effect.

9. The computer program product of claim 8, wherein the method further comprises:
first generating the directed graph.

10. The computer program product of claim 8, wherein the method further comprises:
selecting a second node connected to the first node through a second link; and
assigning the context of the first node to the second node through inheritance.

11. The computer program product of claim 8, wherein determining artifact assessment data for the first node comprises:
selecting the context from a plurality of predetermined contexts comprising deployment, runtime, and customization.

12. The computer program product of claim 8, wherein the event further specifies a change to metadata of a business application that is metadata driven and part of the business application system.

13. The computer program product of claim 8, wherein determining the artifact assessment data for the first node is performed prior to the patch, upgrade or change being applied to the metadata of the artifact.

* * * * *